Oct. 28, 1930.  J. BUZZO  1,780,064
SELF LOADING VEHICLE
Filed June 22, 1929   4 Sheets-Sheet 1
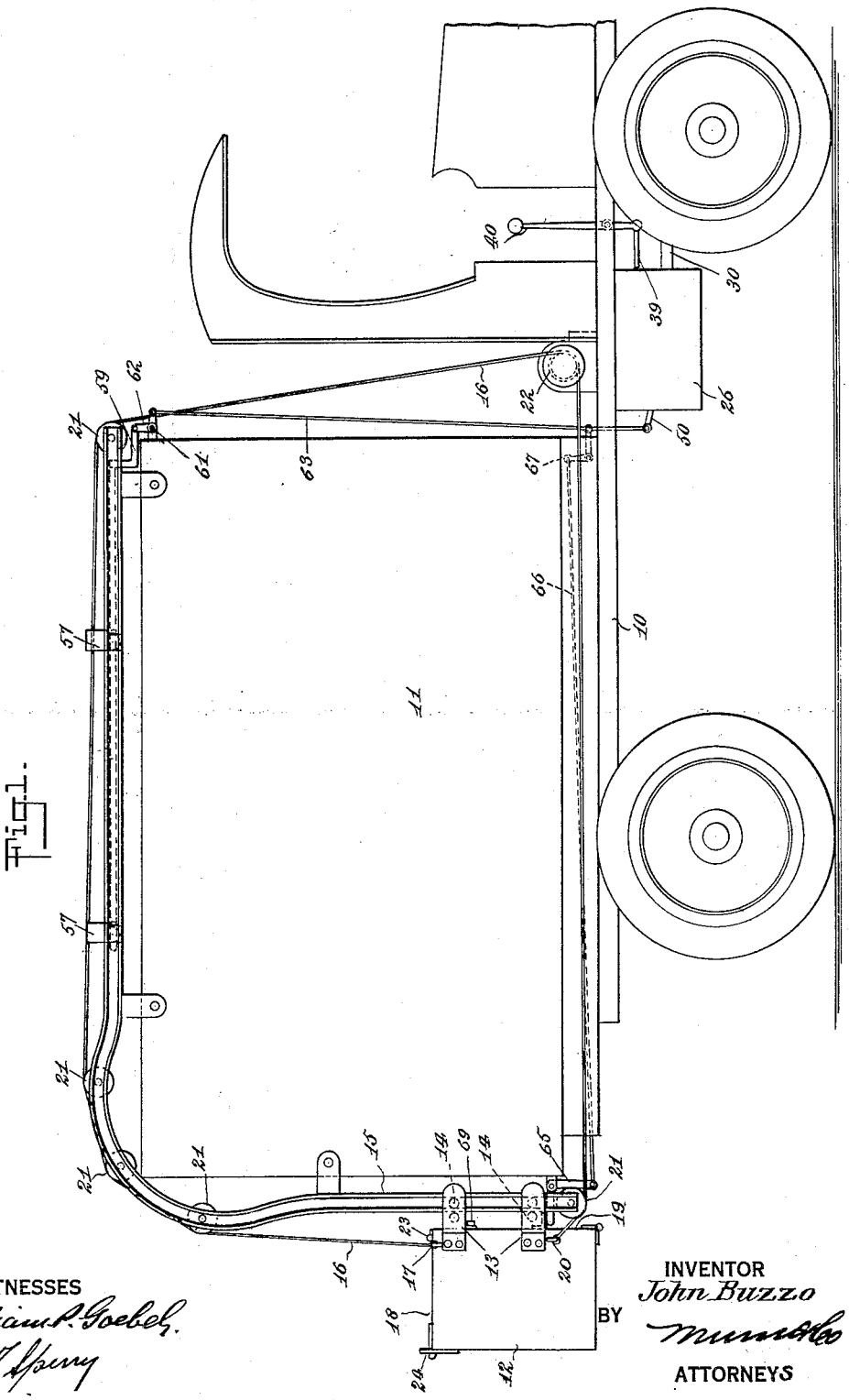
INVENTOR
John Buzzo
BY
ATTORNEYS
WITNESSES Oct. 28, 1930.  J. BUZZO  1,780,064
SELF LOADING VEHICLE
Filed June 22, 1929  4 Sheets-Sheet 2
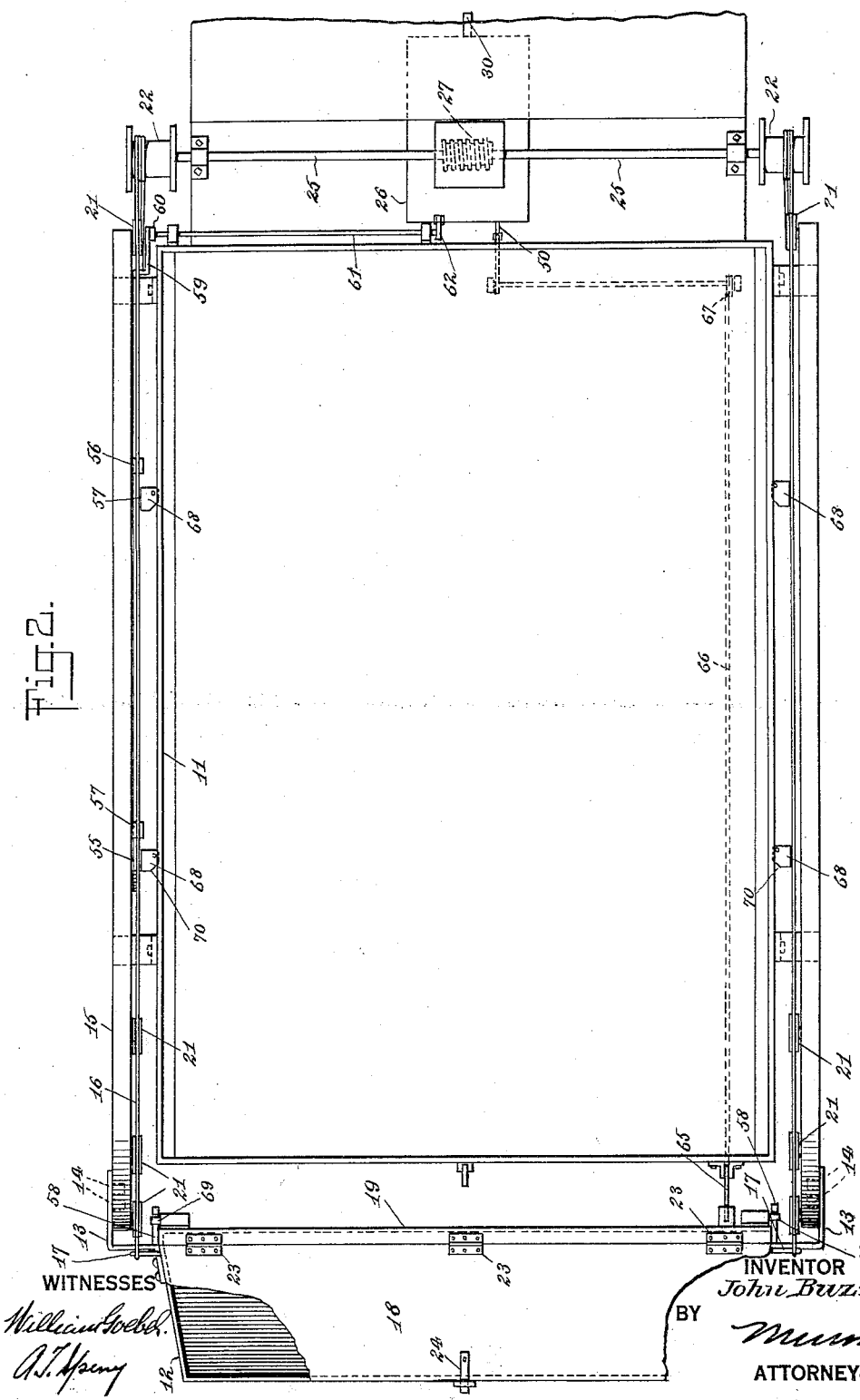

Oct. 28, 1930.   J. BUZZO   1,780,064
SELF LOADING VEHICLE
Filed June 22, 1929   4 Sheets-Sheet 3
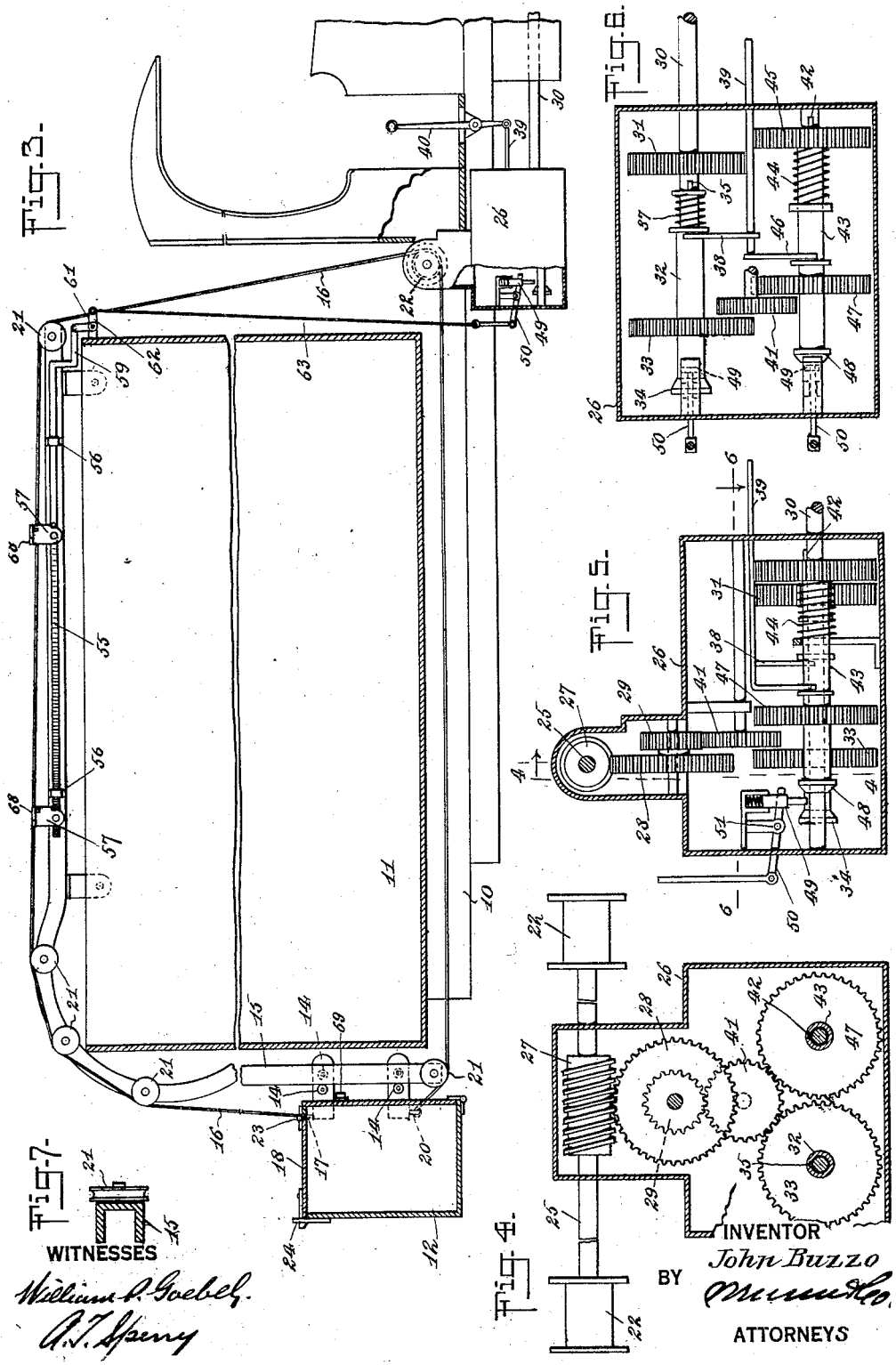
WITNESSES
INVENTOR
John Buzzo
BY
ATTORNEYS Oct. 28, 1930.  J. BUZZO  1,780,064
SELF LOADING VEHICLE
Filed June 22, 1929   4 Sheets-Sheet 4
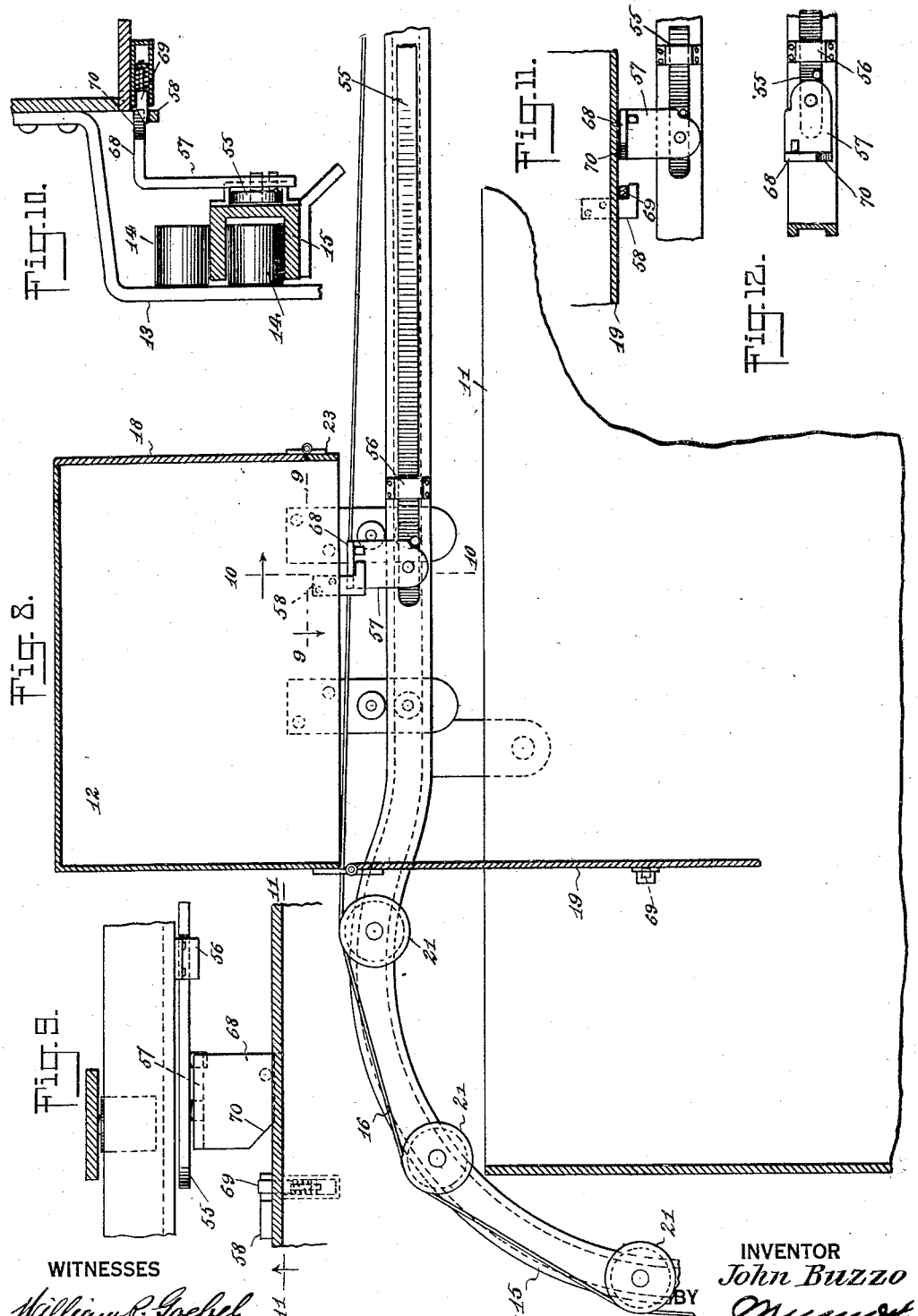
WITNESSES
INVENTOR
John Buzzo
BY
ATTORNEYS Patented Oct. 28, 1930

1,780,064

UNITED STATES PATENT OFFICE

JOHN BUZZO, OF NEW YORK, N. Y.

SELF-LOADING VEHICLE

Application filed June 22, 1929. Serial No. 372,884.

This invention relates to self-loading vehicles.

It is among the prime objects of the present invention to provide a self-loading vehicle of the type particularly adapted for use in connection with the collection of ashes or the like, which is simple in construction and operation and particularly adapted to the demands of economic manufacture.

A further object of the present invention is to provide a vehicle of the class described upon which is mounted a movable receptacle which after loading is adapted to be moved to a position above the vehicle, whereby the contents may be emptied within the vehicle.

A further object of the present invention is to provide in a device of the character described, automatic means for controlling the movement of the receptacle and to automatically open the same to permit discharge of material therefrom.

A further object of the present invention is to provide in a device of the class described, means operable by a motive power engine for moving the receptacle with respect to the vehicle.

A further object of the present invention is to provide in a device of the character described, automatic means operable to stop the movement of the receptacle at predetermined points on the vehicle.

Further objects of the present invention include the combination and interrelation of parts whereby a simple and efficient structure of the class described is provided.

Further objects of the present invention will be apparent from a consideration of the following specification taken in conjunction with the accompanying drawings; in which—

Figure 1 is a side elevation of one preferred embodiment of the present invention;

Fig. 2 is a top plan view of that form of the invention shown in Fig. 1;

Fig. 3 is a vertical section through the invention as illustrated in Figs. 1 and 2;

Fig. 4 is a vertical section through the transmission housing taken on lines 4—4 of Fig. 5;

Fig. 5 is a vertical longitudinal section through the transmission housing;

Fig. 6 is a horizontal section of the transmission housing showing a plan view of the gear arrangement;

Fig. 7 is a detail section of the track and pulley construction;

Fig. 8 is a sectional detail showing the receptacle in raised position with the discharge door open;

Fig. 9 is a detail view taken on lines 9—9 of Fig. 8;

Fig. 10 is a detail section taken on lines 10—10 of Fig. 8;

Fig. 11 is a sectional view taken on lines 11—11 of Fig. 9, and

Fig. 12 is a detail view showing the inoperative position of the control lug shown in Fig. 11.

The present invention is particularly adapted for use in connection with a motor truck and includes a movable receptacle mounted upon a track carried by the truck and movable by cables operated by the truck engine to be raised from a lower rear receiving position to the upper central discharge position. The invention also includes specific structural arrangements whereby the device provides novel improved structure, and the invention also includes suitable transmission means for controlling the actuation of the receptacle moving cables.

Referring more particularly to Fig. 1, the truck as indicated, includes a frame 10, upon which the truck body 11 which is adapted to receive the material is mounted. The movable receptacle is indicated by the numeral 12 and is provided with extending lugs 13 which extend outwardly and inwardly from the side of the receptacle, as shown in Figs. 1 and 10, the extremities of the lugs being provided with a pair of spaced rollers 14, which move upon a track 15, which is substantially U-shaped in cross section, the arrangement being such that the outer roller 14 is carried between the sides of the U, while the inner roller moves on the outer face of the outer leg of the U. It will be seen that this arrangement provides for maintaining the receptacle in conjunction with the track and provides proper roller bearing between the receptacle and the track regardless of the movement of the receptacle over the track.

For moving the receptacle 12, a pair of cables 16 are provided, one end of each of which is secured to the top of the receptacle adjacent the receiving door 18, while the opposite end is secured to the receptacle adjacent the discharge door 19 and adjacent the lower lug 13, as indicated at 20. The cable passes from the attachment point 17 over pulleys 21 which are preferably carried by the track, as illustrated in detail in Fig. 7. From the pulleys 21, the cable passes to the controlling pulleys 22 which may be operated by the truck engine as will be hereinafter described. The lower portion of the cables extends therefrom over the lowermost pulley 21 to be attached to the receptacle as at 20.

Referring more particularly to Fig. 8, it will be seen that the receptacle includes a receiving door 18, which is hingedly mounted upon a cross bar 23 of the receptacle and when the receptacle is in receiving position, as shown in Fig. 1, the door lies in a parallel plane when in closed position and may be hingedly moved to a vertical open position to admit material to the receptacle. It will be understood that the receiving door 18 may be secured in closed position by any suitable latch structure, such as is diagrammatically illustrated at 24 in Fig. 3. The receptacle also includes the discharge door 19 which when the receptacle is in receiving position lies vertical and forms the back of the receptacle, but when the receptacle is in the raised discharging position shown in Fig. 8, the discharging door 19 is in parallel position when closed and may be dropped down to the vertical position shown in Fig. 8, as will be hereinafter described.

For moving the receptacle it will be understood that the cables 16 are adapted to be wound about the pulleys 22, whereby rotation of the pulleys causes the cables to move the receptacle upon the track 15. By referring more particularly to Figs. 4, 5 and 6, it will be seen that the pulleys 22 are mounted upon a transversely-extending shaft 25 which passes through a transmission housing 26, the shaft 25 being provided within the housing 26 with a worm gear 27 mounted for rotation therewith. In mesh with the gear 27, a gear 28 is provided, associated with which a smaller gear 29 is provided.

For driving the cables 16 in a direction to lift the receptacle 12 from the receiving position shown in Fig. 3 a driven shaft 30 associated with the engine is provided, which extends within the housing 26. The shaft 30 is provided with a gear 31 mounted thereon and a sleeve 32 upon which a gear 33 is mounted and which terminates in a sloping projecting flange 34, the arrangement being such that the sleeve is movable longitudinally of the shaft 30 to which it is keyed, by a suitable key 35. The sleeve 32 is normally held in the position shown in Figs. 5 and 6, by an expansion spring 37, and it may be moved forwardly by a yoke 38 carried by a shaft 39 and be longitudinally movable forwardly by the rearward movement of a control lever 40, as shown in Figs. 1 and 3. In the rearward neutral position shown in Fig. 6, it will be seen, by referring to Fig. 5, that the gear 33 is not in mesh with the intermediate gear 41; thus rotation of the shaft 30 will not impart rotation to the shaft 25. When, however, the lever 40 is moved rearwardly, the yoke 38 pushes the sleeve 32 forwardly whereby the gear 33 will enmesh with the intermediate gear 41 and the shaft 25 will be rotated in a direction to move the cables 16 to elevate the receptacle 12 and to bring it to the position indicated in Fig. 8.

For moving the cables in the opposite direction, the shaft 42 is provided within the housing 26, upon which a sleeve 43 is keyed, the sleeve 43 being retained in the neutral position shown in Fig. 6 by a contraction spring 44. The shaft 43 has mounted thereon a gear 45, and the sleeve may be moved rearwardly by a yoke 46 carried by the extremity of the shaft 39. Thus upon forward movement of the lever 40, the sleeve 43 will be moved rearwardly carrying with it the gear 45 and a gear 47 which is also mounted upon the sleeve 43. This movement of the gear 45 will move it into mesh with the gear 41, whereby the sleeve 43 will be rotated, and at the same time, the gear 47 will be brought to enmeshment with the intermediate gear 41 and will rotate it in the opposite direction to the rotation imparted thereto by the gear 43, whereby the receptacle may be moved in an opposite direction along the track and will be returned from the discharging position shown in Fig. 8 to the loading position shown in Figs. 1, 2 and 7.

For locking the sleeves 32 and 43 in their adjusted position as moved by the forward or rearward movement of the lever 40, the end of each sleeve is provided with a tapering projection as shown at 34 on the sleeve 32 and at 48 on the sleeve 43.

By referring to Fig. 5, it will be seen that adjacent each sleeve, a spring-pressed plunger 49 is provided, which is mounted upon the extremity of a lever 50, which is pivoted to the casing as at 51, the arrangement being such that forward movement of the sleeve 32 or rearward movement of the sleeve 43 will cam out its respective plunger 49 against the action of the plunger spring and will permit the plunger to be forced by its own spring against the flat rear side of the projection, thus holding the gears and sleeves in their adjusted position. The arrangement will be seen to be such that a single forward or rearward movement of the lever 40 will set the gears and the plungers 49 will retain the gears in set position until the required movement of the receptacle has been completed.

For moving the plunger associated with the sleeve 32 when the receptacle has reached the desired discharging position, one of the tracks of the upper parallel pair is provided with a longitudinally extending link 55, as shown in Figs. 8 and 10, the link 55 being carried on the inner face of the track and movable within guiding straps 56. The rear end of the link 55 is provided with a pivotally mounted dog 57, which is adapted to be engaged by a catch 58 carried by the side of the receptacle 12, whereby when the receptacle has reached the position shown in Fig. 8, the catch 58 will engage the dog 57 and longitudinally move the link 55. The forward end of the link 55 terminates in an inwardly extending angular portion 59 which cooperates with a crank 60 to rock a transversely extending shaft 61 which extends to the center of the vehicle. At the center of the vehicle the shaft 61 is provided with a crank 62 which connects by a link 63, the outer extremity of the lever 50, the arrangement being such that when the receptacle moves the link 55, it will move downwardly a link 63 and raise the plunger 49 to release the sleeve 32, allowing it to move under the influence of its spring 37, to the neutral position shown in Fig. 6.

For releasing the sleeve 43 when the receptacle is in the receiving position shown in Fig. 1, the catch 58 of the receptacle is adapted to strike the free arm of a bell crank, thus moving forwardly a connecting link 66 shown in Fig. 1, which rocks a connecting bell crank 67 which is associated with the lever 50 associated with the sleeve 43. Thus the plunger associated with that sleeve is moved upwardly against the tension of its spring and the sleeve is released to be moved by the spring 44 to the neutral position shown in Fig. 6. It will readily be seen that the arrangement is such that the attendant need only to set the gears by movement of the lever 40 to raise or lower the receptacle 12 and that at the end of the desired movement of the receptacle the linkage connections will be such as to release the gears allowing them to assume the normal neutral position shown.

As shown in Figs. 11 and 12, the dog 57 is pivotally associated with the link 55 in such a manner that it may be moved to the position shown in Fig. 12, whereby the receptacle may pass thereover and be stopped by a similar dog arranged farther forward on the link 55. Thus a selection in the position at which the receptacle is brought to rest may be readily attained.

For automatically opening the discharge door 19 of the receptacle, the dog 57 is provided with an inwardly extending angled extremity 68, as shown in Figs. 9 and 10.

The receptacle cover 19 is also provided with a spring-pressed plunger 69 which is normally adapted to be received under the catch 58 to retain the door in closed position. The rear portion of the extension 58 is, however, beveled as at 70, whereby upon engagement of the receptacle with the dog 68, the plunger 69 will be cammed inwardly by the bevel 70, whereby the door will be released from the catch and will drop by gravity to the open position shown in Fig. 8. Thus it will be seen that the dog 57 performs a double function in both actuating the sleeve release mechanism and in opening the door 19.

In the operation of the present device it will be seen that in the position shown in Figs. 1 and 3, the truck may be moved to the desired position and the door 18 opened, whereby the receptacle 12 may receive refuse material. When the receptacle 12 is lowered, the lever 40 is moved rearwardly, thus moving forwardly the sleeve 43 and engaging the gears 33 and 41, whereby the shaft 25 will be rotated and the cable 16 will move the receptacle upwardly along the track until such time as the receptacle engages the dog 57. The engagement of the dog as hereinbefore described will operate to open the discharge door 19 and to move the plunger 49 of the sleeve 32, thus releasing the sleeve and permitting it to move to the neutral position. When the contents of the receptacle have been discharged, the lever 40 may be moved forwardly thus moving the sleeve 43 into operative engagement whereby the shaft 25 will be rotated in a reverse direction and the receptacle will be returned to the receiving position, in which position the catch 58 of the receptacle will operate through the bell crank and linkage system to raise upwardly the plunger 49 of the sleeve 43, whereby the sleeve will automatically return to its neutral position and the device will be ready for an additional load to the receptacle 12.

It will be understood that the invention is not confined to the specific structure herein presented, and that numerous changes and modifications and the full use of equivalents may be resorted to without departing from the spirit or scope of the invention as outlined in the appended claims.

What is claimed is:

1. In a vehicle, the combination with a vehicle body, of a receptacle carried by said body and movable with respect thereto, said body including track members for guiding said receptacle, said receptacle including rollers receivable by said tracks, means for moving said receptacle, said means including cables associated with said tracks, means for moving said cables by the motor of said vehicle, said last-mentioned means including a gear mechanism adjustable to move said cables in either direction, plungers for holding said mechanism in adjusted position, and means for releasing said plungers by movement of said receptacle.

2. In a vehicle, the combination with a vehicle body, of a receptacle carried by said body and movable with respect thereto, said receptacle having separate loading and discharge doors, means for moving said receptacle from a loading position behind the body to a discharging position above said body and for returning the same, said means being operable to turn said receptacle about its longitudinal axis, said doors being on separate adjacent sides of said receptacle whereby said turning will move to a vertical position the normal horizontal loading door and will move to a horizontal position the normal vertical discharge door, and means automatically operable to release said discharge door after predetermined movement of said receptacle.

3. In a vehicle, the combination with a vehicle body, of a receptacle carried by said body and movable with respect thereto, said receptacle having separate loading and discharge doors, means for moving said receptacle from a loading position behind the body to a discharging position above said body and for returning the same, said means being operable to turn said receptacle about its longitudinal axis, said doors being on separate adjacent sides of said receptacle whereby said turning will move to a vertical position the normal horizontal loading door and will move to a horizontal position the normal vertical discharge door, and means automatically operable to release said discharge door after predetermined movement of said receptacle, said means being operable to stop the movement of said receptacle.

Signed at New York city, in the county of New York and State of New York, this 20 day of June, 1929.

JOHN BUZZO.